United States Patent [19]

Antkowiak

[11] Patent Number: 5,344,291
[45] Date of Patent: Sep. 6, 1994

[54] MOTOR PUMP POWER END INTERCONNECT

[75] Inventor: Richard P. Antkowiak, Rye, N.H.

[73] Assignee: A. W. Chesterton Company, Stoneham, Mass.

[21] Appl. No.: 91,978

[22] Filed: Jul. 15, 1993

[51] Int. Cl.$^5$ ............................................. F01D 7/00
[52] U.S. Cl. .................................... 417/359; 417/361; 417/363; 417/423.13; 415/131; 415/132
[58] Field of Search ............... 417/359, 360, 361, 363, 417/423.6, 423.13; 415/131, 132

[56] References Cited

U.S. PATENT DOCUMENTS

| | | |
|---|---|---|
| 1,917,644 | 7/1933 | Guy . |
| 2,002,646 | 5/1935 | Smith . |
| 2,117,919 | 5/1938 | Summers . |
| 2,434,979 | 1/1948 | Bergh ................................. 417/359 |
| 2,935,279 | 5/1960 | Porte et al. . |
| 3,324,798 | 5/1968 | Freed ............................. 417/359 X |
| 3,380,314 | 4/1968 | Halsted . |
| 4,079,926 | 3/1978 | Nunes . |
| 4,230,438 | 10/1980 | Lehmann et al. ................. 417/359 X |
| 4,386,886 | 6/1983 | Neal ...................................... 415/131 |
| 4,439,096 | 3/1984 | Rockwood et al. . |
| 4,988,069 | 1/1991 | D'Silva . |
| 5,040,953 | 8/1991 | Tinsler . |
| 5,046,700 | 9/1991 | Hoshino . |

OTHER PUBLICATIONS

Chesterton 1988 brochure entitled "System One Pump—The Advanced Pump That Reduces Operational Costs".

Primary Examiner—Richard E. Gluck
Attorney, Agent, or Firm—Hill, Steadman & Simpson

[57] ABSTRACT

A combination frame arranged between a centrifugal pump and a driver, such as a motor, the combination frame having in a central region thereof a compartment for holding shaft bearings and a quantity of oil, and a pump adapter frame arranged between said compartment and said pump, and a driver adapter frame arranged between said compartment and said driver, the pump and driver adapter frames and the compartment cast or forced as an integral structurally seamless frame between pump and driver. The driver adapter frame radially surrounds and covers impeller axial adjustment studs and reference nuts at the bearing housing, for protection. The combination frame of the present invention provides a stronger structural integrity than the multi-component frames of the prior art which allows for more precise alignment of the coupling between motor and pump which reduces vibration.

16 Claims, 4 Drawing Sheets

MOTOR PUMP POWER END INTERCONNECT

BACKGROUND OF THE INVENTION

This invention relates to centrifugal pumps and to an improved connection structure between a driver and the pump; and to an improved arrangement of impeller position adjustment means in such pumps.

Typically, centrifugal pumps have three components arranged between the driver and the pump housing. These components consist of a motor adapter frame, the bearing housing and the pump adapter frame. Heretofore these components have been separately formed and installed together by bolting as shown in U.S. Pat. No. 4,439,096, issued Mar. 27, 1984.

As also shown in U.S. Pat. No. 4,439,096, impeller position adjustment means are provided. This reference describes a centrifugal pump having a bladed impeller in a stationary pump casing, the leading edges of the blades being adjacent a first radially extending wall of the housing. The pump has a rotatable shaft on which the impeller is mounted, a bearing cartridge holding a thrust bearing therein for rotatably holding the end of the shaft which is opposite the impeller, and adjustable fastening means for connecting the bearing cartridge to the bearing housing. The impeller, shaft and bearing cartridge together are adapted for axial adjustment upon axial adjustment of the fastening means, the fastening means having at least two threaded bolts projecting from the bearing housing in a direction parallel to the axis of the shaft, and having reference nuts for fixing the position of the bearing cartridge on the bolts. The reference nuts have marks at regular angular intervals, and at least one reference mark on the bearing cartridge adjacent each reference nut cooperating with the marks on the reference nuts for indicating the axial position of the impeller with respect to the pump casing. However, the bolts and reference nuts are exposed to environmental and weather conditions.

SUMMARY OF THE INVENTION

In one aspect of the invention, a centrifugal pump has an impeller mounted within a pump casing onto a shaft extending axially out of the casing and into a bearing housing. A pump adapter frame connects the pump to the bearing housing. The bearing housing houses front and rear bearings which journal the shaft. The bearing housing contains a quantity of oil and an oil slinger. The shaft proceeds out of the bearing housing towards a driver shaft and is coupled thereto within a driver adapter frame. The driver adapter frame is connected by bolts to the stationary frame of the driver such as an electric motor. According to the invention, the driver adapter frame, the bearing housing and the pump adapter frame are formed integrally such as by forging or casting of one piece. The combined frame can span unsupported between the driver and the pump casing. A motor frame and the pump casing can be soft supported by rubber bushings or spring mounts to a foundation or floor.

The one piece design allows for greater rigidity between motor driver and pump casing which allows for closer alignment of the coupling which is critically important for vibration reduction. Additionally, the manufacturing cost of the combination frame is drastically reduced compared to the cost for individual frame components, i.e., pump adapter frame, bearing housing, and driver adapter frame.

In another aspect, the invention features reference nuts and studs which are confined radially within the driver adapter frame for protection. The driver adapter frame can have removable panels for access for adjusting the reference nuts, which during operation are in place to provide weather and environmental protection.

Other objects, features and advantages of the invention will be apparent from the following description of the preferred embodiments and from the claims.

DESCRIPTION OF THE PREFERRED EMBODIMENTS

Figure 1:
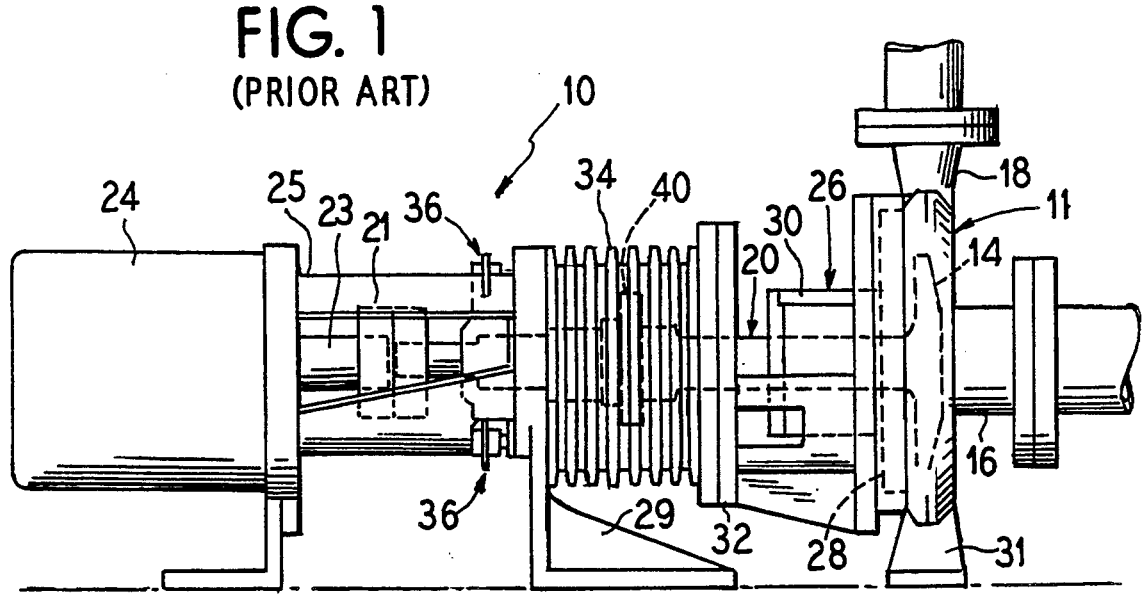
FIG. 1 is a side elevation view of a prior art pump assembly.
Figure 2:
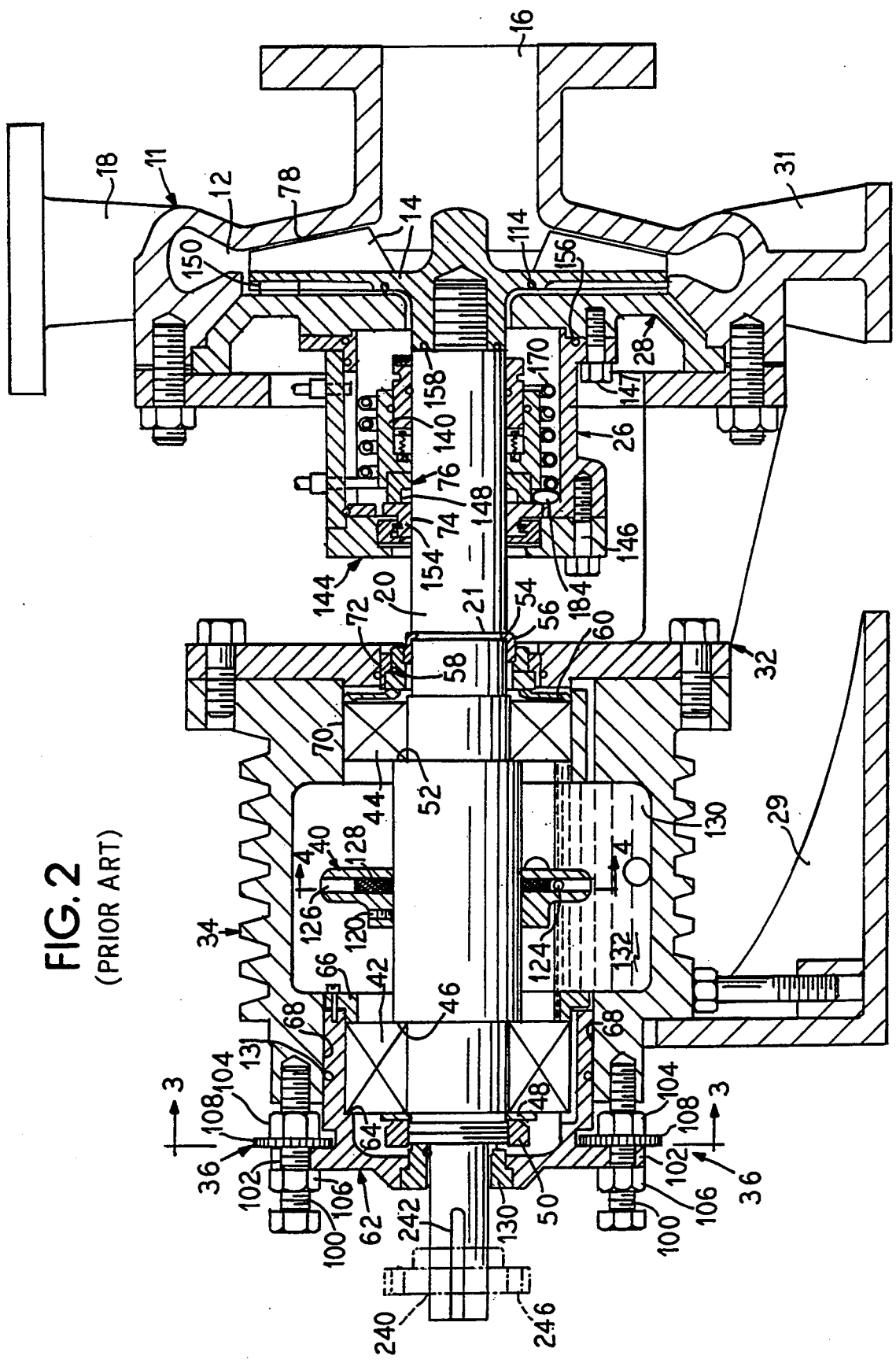
FIG. 2 is an enlarged sectional view of the pump assembly of FIG. 1 with the motor and motor adapter removed, showing one type of seal housing.

FIGS. 1 and 2 illustrate a known pump and driver arrangement such as shown and described in U.S. Pat. No. 4,439,096. These figures illustrate a pump assembly 10, wherein a pump housing 11 defines an impeller chamber 12 (shown in FIG. 2) in which impeller 14 rotates to pump fluid from pump inlet 16 to pump outlet 18. Impeller 14 is mounted on one end of shaft 20. The other end of the shaft 20 is coupled by a bolted coupling 21 to a motor shaft 23 of a motor 24. The motor 24 is bolted to a motor adapter frame 25. Behind pump housing 11, shaft 20 is enclosed by a removable seal housing 26 which is bolted to the backplate 28 of pump housing 11. Also bolted to pump housing 11 is one end of a pump frame adapter 32, the other end of which is bolted to bearing housing 34 (which serves as a shaft support for the end of the shaft opposite the impeller) to assure the axial alignment of the shaft 20, pump housing 11 and bearing housing 34. The bearing housing 34 is bolted to the motor adapter frame 25 which assures alignment between the shaft 20 and the motor shaft 23. Adjustable fastening means 36 are positioned behind bearing housing 34 for adjusting the axial position of impeller 14. Rear foot 29 and casing foot 31 support the pump assembly, foot 29 extending on each side of the center of gravity of the assembly when disconnected from the impeller.

Referring to FIG. 2, which shows the pump in greater detail, shaft 20 is supported rotatably by a pair of bearings 42, 44 housed within bearing house 34. The position of rear bearing 42 is fixed axially with respect to shaft 20 by recessed shaft surface 46 (adjacent the forward end of bearing 42) and by washer 48 and threaded retainer nut 50 (adjacent the rearward end). Bearing 42 is also held fixed within a bearing cartridge 62 by retaining surface 64 and by retaining ring 66 which is bolted to the bearing cartridge. Similarly, the position of front bearing 44 on shaft 20 is set (on the rear end) by recessed shaft surface 52. A spring retaining ring 54 (which seats in groove 21 in shaft 20) and retainer 56 together force oil seal 58 and coupling ring 60 against the front end of bearing 44, and assure proper seal compression of seal 58.

The shaft assembly, including the shaft 20, bearings 42, 44, bearing cartridge 62, and impeller 14 (which is screwed onto the threaded front end of shaft 20), is free to be moved axially, because the cylindrical outer surface of the cartridge housing 62 is free to slide in the cylindrical bearing housing bore 68 in which it is mounted, the cylindrical outer surface of cylindrical bearing 44 is free to slide in the bearing housing bore 70 in which it is mounted, the cylindrical outer surface of oil seal 58 is free to slide in cylindrical bearing frame adapter bore 72 in which it is mounted, and shaft 20 is free to slide in the stationary element 74 of seal 76. The axial excursion of the shaft assembly is limited in one direction by the radially extending wall 78 of pump housing 11, which is adjacent to the leading edge 80 of impeller 14, and in the other direction by radially extending face 82 of backplate 28 which is adjacent to the trailing edge 84 of impeller 14.

The axial position of the shaft assembly is determined by the adjustable fastening means 36 which comprise two bolts 100 which pass through clearance holes 102 in bearing cartridge 62 and are firmly screwed into the back of bearing housing 34, and a reference nut 104 and a lock nut 106 screwed onto each bolt 100, with the bearing cartridge between them, so that they can be tightened down onto the bearing cartridge to adjust and fix its axial position.

Referring to FIG. 2, a centrifugal lubricator or slinger 40 (of metal or plastic) is positioned in bearing housing 34 for lubricating bearings 42, 44. Lubricator 40 is fixed to shaft 20 by set screw 120. Lubricator 40 has an annulus 121 with a circular internal tube 122 the inner wall of which is defined by the surface of shaft 20. A tubular passage through the outer wall of annulus 121 defines entrance opening 124 tangential to the tube. A number of spaced exit openings 126 (oriented radially from shaft 20) in its side pass through the outer periphery of the annulus. Mesh screen 128 (e.g., nylon with mesh openings between 50 and 300 microns) is arranged around the inner wall of the tube covering the exit openings.

The inner surface of bearing housing 34 is contoured to define an oil reservoir 130 containing oil 132 to a level such that oil can enter entrance opening 124 during each rotation of lubricator 40 on shaft 20. Oil which has entered tube 122 is thrown centrifugally out through exit openings 126 (after passing through screen 128, which removes carbon and particulate contaminants). Oil seals 58 and 130 (housed in the opposite ends of the bearing housing) and oil seal 131 on the outer surface of bearing cartridge 62 prevent leakage of oil from the bearing housing.

Seal housing 26 contains a mechanical seal 76 having a rotating element 140 (attached by set screw 142 to shaft 20) and a corresponding stationary element 74 held in place by seal gland 144 bolted by bolts 146 to the seal housing. The seal housing is demountably connected by bolts 147 to the backplate 28. The rotating element and stationary element bear against one another rotatably at seal surface 148. Seal 76 prevents leakage to the outside of the pump of any fluid which (instead of being pumped into pump outlet 18) follows a fluid path over and behind impeller 14, along cavity 150 on the back of the impeller and into the seal housing. Leakage of such fluid from the seal housing is also prevented by static (e.g., 0-ring) seal 152 (between cover 30 and seal housing 26), seal 154 (between the seal gland and the stationary element of the seal), seal 156 (between the seal housing and the backplate of the pump housing), and seal 158 (between the impeller and the shaft). Cover 30 permits access to seal 76 and shaft 20 within seal housing 26 for repair, impeller 14 being backed to face 82 before cover 30 is opened to seal chamber 12 from seal housing 26.

Figure 3:
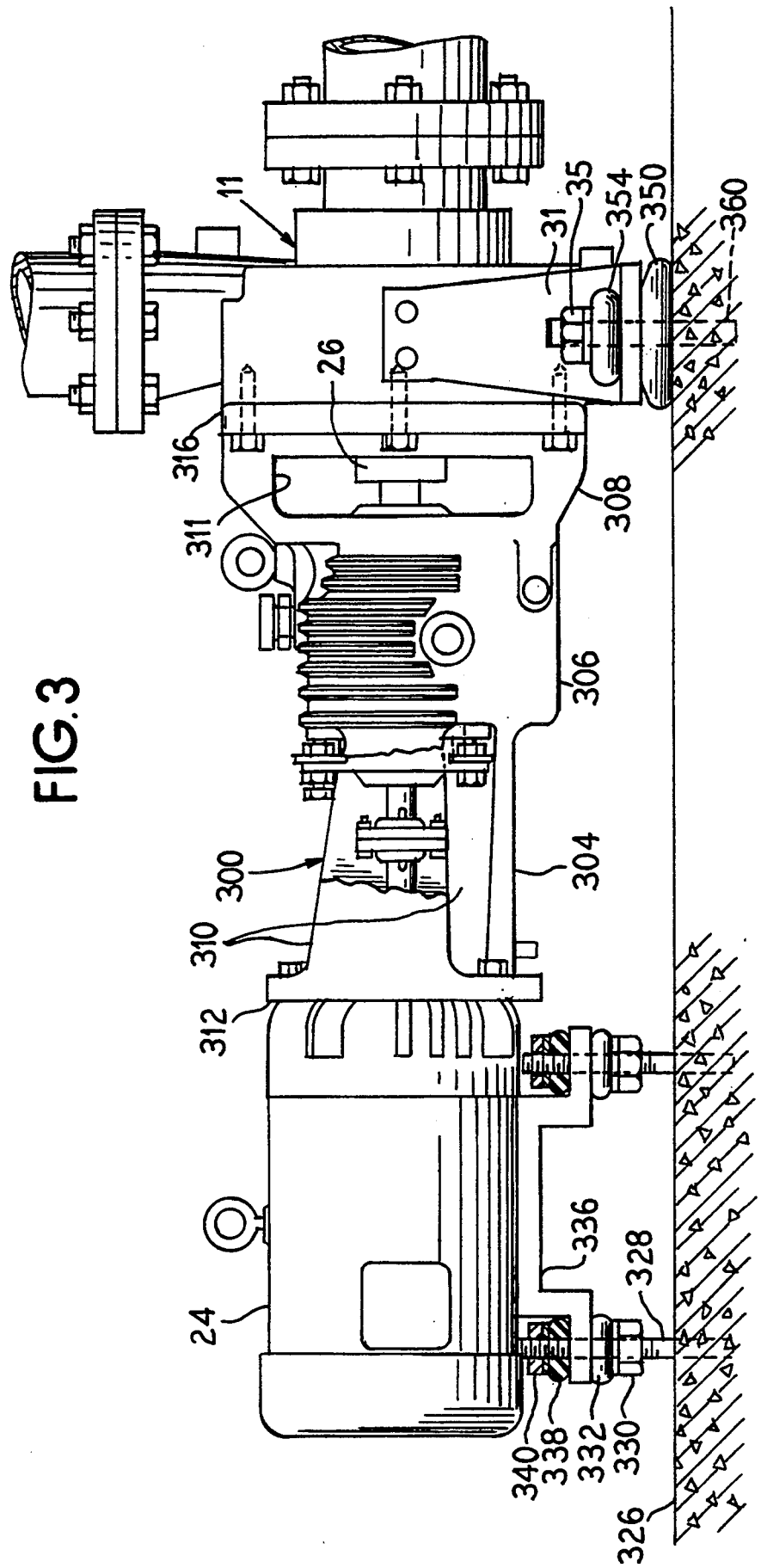
FIG. 3 is an elevational view of a motor and pump assembly of the present invention.

FIG. 3 shows the improved aspect of the present invention. In this version, a combination frame 300 is provided between the pump 11 and the motor 24. The combination frame 300 provides a motor adapter frame 304, a bearing housing 306 and a pump adapter frame 308 all integrally formed together such as by casting or forging. The motor adapter frame 304 can surround the coupling 21 with sufficient openings 310 for access for coupling and uncoupling. The pump adapter frame 308 can surround the seal housing 26 as per FIG. 1 and FIG. 2. Sufficient openings 311 are provided for cooling and inspection. The combination frame 300 can span between the pump 11 and the motor 24 without intermittent support. At the interface 312 between the motor 24 and the frame 300, the frame 300 is bolted to the motor 24. At the interface 316 between the pump frame adapter 308 and the pump 11, the pump adapter frame 308 is bolted to the pump 11.

As shown in FIG. 3, the motor is supported from a floor 326 by a plurality of anchor bolts 328, support nuts 330, lower rubber bushings 332, a U-shaped bracket 336, upper rubber bushings 338, and retaining nuts 340. The combination of elements makes for a soft support which dampens vibration.

The pump 11 is mounted by a similar arrangement. However, the lower support nuts 330 can be eliminated as the pump base sets the elevational requirements and no elevational adjusting of the pump need be accounted for. Therefore, a lower bushing 350 supports the pump bracket 31 directly off the floor 326. An upper bushing 354 and a retaining nut 356 are thereupon mounted to an anchor bolt 360.

Figure 4:
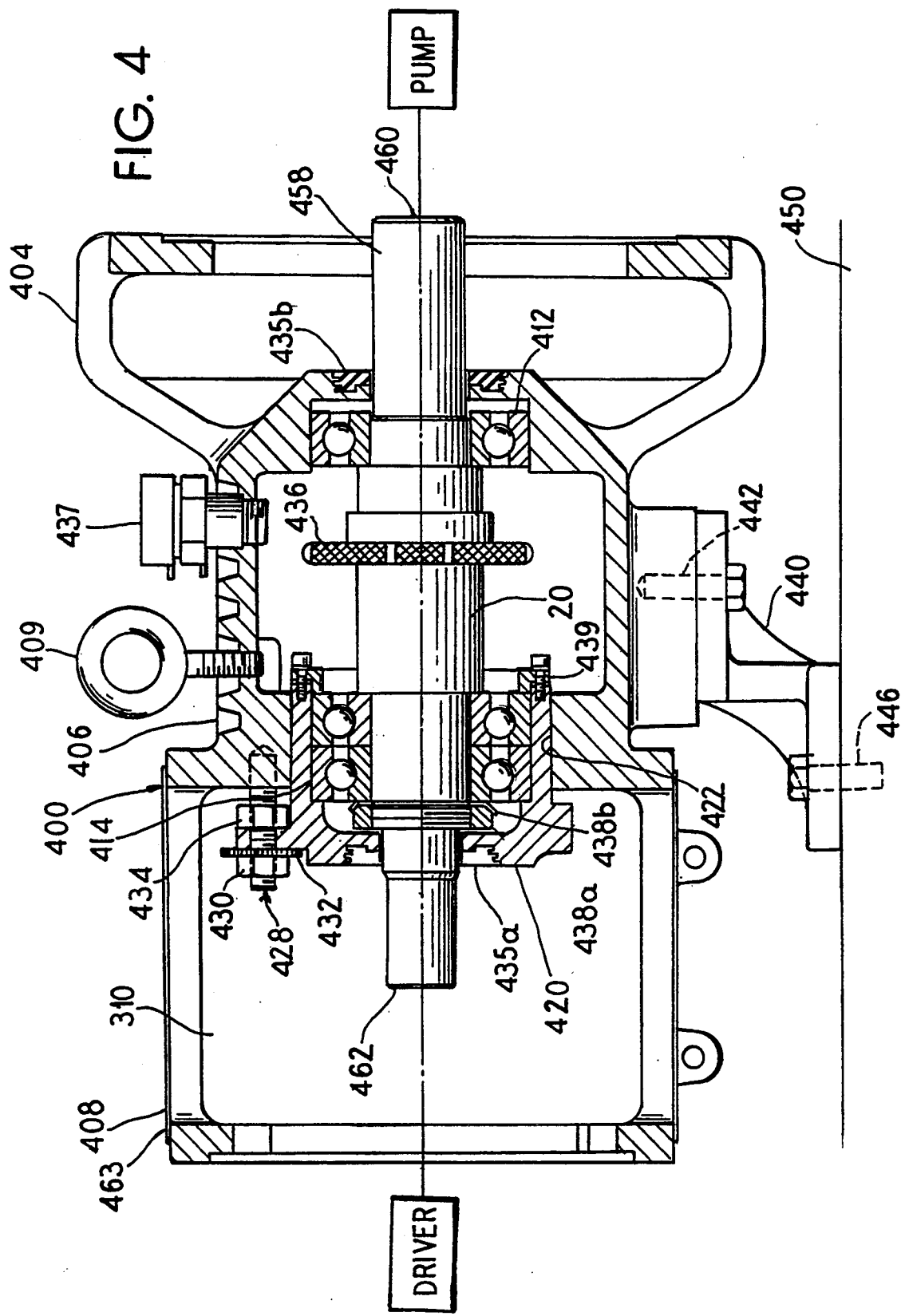
FIG. 4 is a longitudinal sectional view of a motor/pump combination adapter of the present invention.

FIG. 4 shows an alternate configuration for a combination frame 400 for coupling a driver and a pump. A pump adapter frame 404 is formed integral with a bearing housing 406 and a motor adapter frame 408. An eyebolt 409 is provided for lifting the frame 400. Within the bearing housing 406 is journaled a front bearing 412 and a double rear bearing 414. The double rear bearing 414 acts as thrust bearing and is fixed for axial movement within a cartridge housing 420 which itself is axially positionable within a bore 422 of the bearing housing 406. The cartridge 420 is slidable by adjustment of at least one adjuster 428 having a reference nut 430 with a fine tuning rim 432 similar to the rim 108 previously described. A lock nut 434 is provided to lock the precise position once arrived at. The operation of the adjusters is described in more detail in U.S. Pat. No. 4,439,096, which is herein incorporated by reference. According to the present invention, the adjusters 428 are located entirely within the radial confines of the motor adapter frame 408.

Labyrinth oil seals 435a, b are provided at opposite ends of the bearing housing 406 surrounding the shaft 20. An oil slinger 436 is provided, locked to the shaft 20 and which operates as described with respect to the lubricator 40 of FIG. 2. An oil fill assembly 437 is provided for replenishing oil into the bearing housing 406. A thrust bearing lock nut 438a and a lock washer 438b work in combination with a retainer cover 439 to axially retain the bearings 414 within the cartridge 420.

In the embodiment of FIG. 4, the combination frame 400 is itself supported via a bracket 440, a frame bolt 442 and an anchor bolt 446 into a floor 450. However, as per FIG. 3, the combination frame 400 can be designed to span between pump and motor without such an intermediate support. The front and rear bearings 412, 414 journal the shaft 20 which at a first end 460 is coupled to the impeller as per FIG. 2 and at a second end 462 is coupled to the motor as per FIG. 1. A coupling guard 463 can be provided to close the openings 310 provided for coupling access. The guard 463 also can serve to enclose the adjusters 428 to protect the adjusters from environmental effects and weather. A cartridge seal can be employed at the first end 460, as per FIG. 2. The cartridge seal will fit within the pump adapter frame 404.

Figure 5:
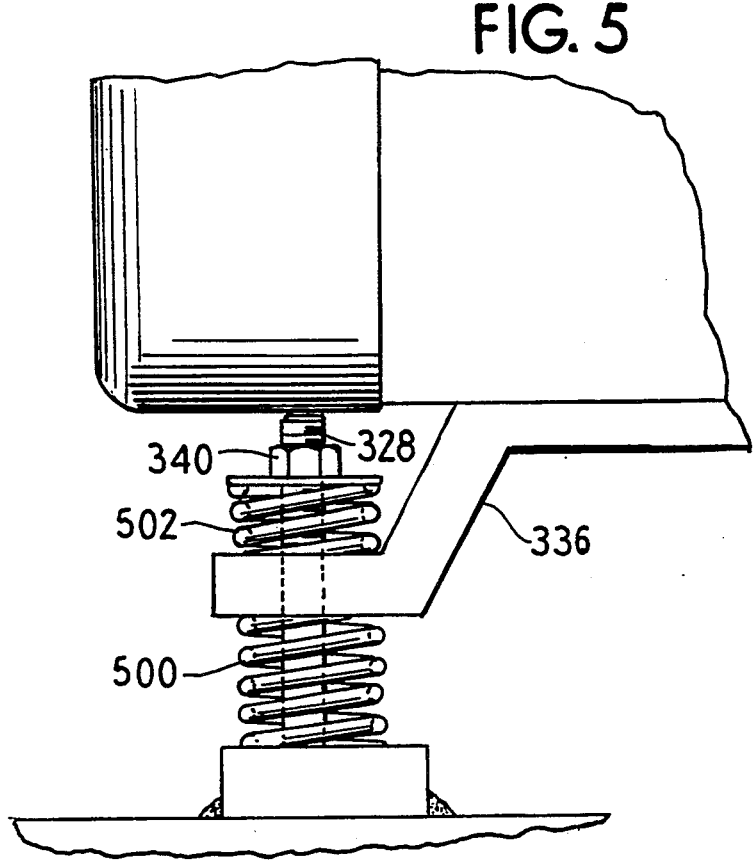
FIG. 5 is an enlarged elevational view of an alternate mounting for the motor shown in FIG. 3.

FIG. 5 illustrates an alternate mounting for the pump and motor shown in FIG. 3, wherein the U-shaped bracket 336 is captured on the anchor bolt 328 and urged from below and from above by springs 500, 502, respectively.

Although the present invention has been described with reference to a specific embodiment, those of skill in the art will recognize that changes may be made thereto without departing from the scope and spirit of the invention as set forth in the appended claims.

I claim as my invention:

1. A pump arrangement comprising:
   a centrifugal pump having a pump casing and an impeller mounted on an impeller shaft for rotation within said casing, said impeller shaft protruding out of said casing;
   a driver having a drive shaft, said driver mounted with said drive shaft axially aligned with and coupled to said impeller shaft;
   a frame mounted at one end to said driver and at an opposite end to said casing and having an enclosed compartment therebetween, said compartment having at least one bearing therein and capable of holding a quantity of oil therein and means for applying said oil to said bearing, said bearing journaling said impeller shaft for rotation within said compartment; and
   said frame being structurally continuous between said driver and said casing without bolted seams.

2. The arrangement according to claim 1, wherein said compartment is arranged at a distance from said casing along said impeller shaft, and said arrangement further comprises a mechanical seal housing mounted to said casing and surrounding said impeller shaft.

3. The arrangement according to claim 1, wherein said compartment is located at a distance from said driver and said drive shaft and said impeller shaft are connected by a mechanical coupling arranged within said frame.

4. The arrangement according to claim 1, wherein said frame spans between said driver and said casing without intermediate support.

5. The arrangement of claim 1, wherein said driver is supported off of a floor and said pump is supported off of said floor, said supports being soft supports.

6. The arrangement of claim 1, wherein said driver is supported off of a floor and said pump is supported off of said floor, said supports being spring loaded supports.

7. The arrangement of claim 1, wherein one of said driver and said casing is supported off of a floor by a resilient bushing.

8. The arrangement of claim 7, wherein said one of said driver and said casing has a support bracket which is supported on a support nut threaded onto an anchor bolt engaged to said floor and which pierces said support bracket, and an overlying upper bushing is arranged over the bracket and held to the bracket by an overlying hold down nut threaded onto the anchor bolt.

9. The arrangement of claim 7, wherein said one of said driver and said casing has a support bracket pierced by an anchor bolt engaged to said floor, said support bracket bearing onto said bushing, and further comprising an upper bushing overlying said support bracket, and a hold down nut threaded onto said anchor bolt and compressing said upper bushing against said support bracket.

10. An adapter frame for connecting a driver to a centrifugal pump, wherein said pump has a pump shaft extending axially from an impeller mounted rotationally within a casing and said driver has a stationary frame and a drive shaft axially aligned and coupled to said pump shaft, comprising:
    a pump frame adapter arranged and adapted to be boltable to said casing;
    a bearing housing having at least one bearing held therein to rotationally support said pump shaft, and configured to hold a quantity of lubricating oil for lubricating said bearing; and
    a driver frame adapter arranged and adapted to be boltable to said stationary frame of said driver;
    said pump frame adapter, said bearing housing and said driver frame adapter formed of one integral piece, without bolted seams, between said stationary frame of said driver and said casing.

11. The adapter frame of claim 10, wherein said drive shaft is coupled to said pump shaft by a mechanical coupling and said driver frame adapter surrounds said mechanical coupling with at least one clearance for accessing said coupling.

12. The adapter frame of claim 10, wherein a seal housing is applied around said pump shaft and connected to said casing and said pump adapter frame is arranged and adapted to surround said seal housing with at least one clearance for access to the seal housing.

13. A centrifugal pump comprising a bladed impeller in a stationary pump casing, the leading edges of said blades being adjacent a first radially extending wall of said casing, a rotatable shaft on which said impeller is mounted, a shaft support for rotatably holding the end of said shaft which is opposite said impeller, and adjustable fastening means for connecting said shaft support to a stationary member, said impeller, shaft and shaft support together being adapted for axial adjustment upon axial adjustment of said fastening means, said fastening means comprising at least two threaded members projecting from said stationary member in a direction parallel to the axis of said shaft, and reference nuts on said members, having marks at regular angular intervals, and at least one reference mark on said shaft support adjacent each reference nut cooperating with said marks on said reference nuts for indicating the axial position of said impeller with respect to said pump casing; and said stationary member comprising a frame surrounding said threaded members and reference nuts in a radial direction with respect to said axis of said shaft.

14. The pump according to claim 13, wherein said frame comprises at least one removable panel for covering said threaded members and reference nuts and removable for access thereto.

15. The pump according to claim 14, wherein said frame comprises a driver adapter frame boltable directly to a driver frame.

16. The pump according to claim 13, wherein said stationary member comprises a bearing housing and said shaft support comprises a cartridge axially movable with respect to said housing and holding axially fixed therein a thrust bearing journaling the shaft;

said stationary member comprises a pump adapter frame formed integral with said bearing housing and boltable directly to said pump casing; and said frame comprises a driver adapter frame boltable directly to a driver frame, and formed integral with said bearing housing.

* * * * *